United States Patent
Less

[11] 4,033,392
[45] July 5, 1977

[54] WEATHERPROOFING DEVICE FOR CAMERAS

[76] Inventor: Henry R. Less, 248 Bancroft Bay, Winnipeg, Canada

[22] Filed: Apr. 23, 1976

[21] Appl. No.: 679,673

[52] U.S. Cl. .............................. 150/52 J; 354/64
[51] Int. Cl.² ....................................... G03B 17/56
[58] Field of Search ............. 150/52 J; 354/64, 75, 354/76; 352/242

[56] References Cited
UNITED STATES PATENTS

| | | | |
|---|---|---|---|
| 1,535,312 | 4/1925 | Hosking | 150/52 J UX |
| 3,036,506 | 5/1962 | Andresen | 150/52 J X |

Primary Examiner—Donald F. Norton
Attorney, Agent, or Firm—Stanley G. Ade

[57] ABSTRACT

A lightweight flexible transparent plastic enclosure is provided with a reinforced circular aperture engaging over the camera lens with the camera being enclosed within the enclosure. A screw on filter is then engaged with the lens ring and clamps the boundary of the aperture against the lens ring in sealing relationship. Alternatively, a pair of rings screw threadably engaged together and clamp the boundary of the aperture of the enclosure there between and this pair of rings is then in turn held against the lens ring by the screw threadable engagement of the filter with the lens ring. The flexible and transparent bag enables the camera to be manipulated but at the same time it is protected against adverse weather conditions such as sand, dust, salt water spray and the like.

6 Claims, 7 Drawing Figures

WEATHERPROOFING DEVICE FOR CAMERAS

BACKGROUND OF THE INVENTION

This invention relates to new and useful improvements in weatherproofing devices for cameras.

While it is known to provide a relatively heavy-duty and expensive waterproof enclosures for cameras such as those used by divers and the like, nevertheless these are not practical for use under normal conditions as they are extremely heavy, and extremely expensive.

SUMMARY OF THE INVENTION

The present invention overcomes the problems encountered by a photographer under adverse conditions by providing a lightweight transparent flexible enclosure such as a plastic bag for example, within which the camera is placed, said enclosure having a circular reinforced aperture formed through the wall thereof through which the outer end of the lens assembly may be engaged. Front and rear rings are screw-threadably engaged together and clamp the wall surrounding the aperture therebetween. A conventional filter ring is then screw threadably engaged with the end of the lens assembly thus clamping the rings between the filter and the end of the lens assembly so that the camera is fully protected against adverse weather conditions.

The enclosure is provided with access means which are conventional and which may be closed once the camera has been placed within the enclosure.

The relatively thin soft flexible enclosure enables the operator to manipulate the camera in the usual way yet at the same time the camera is fully protected against adverse weather conditions such as rain, dust, sand, salt water spray, industrial contaminants and the like.

Although it is not designed for use under water, nevertheless the enclosure is sufficient to protect the camera for short periods of inadvertent immersion.

The principle object and essence of the invention is therefore to provide a device of the character herewithin described within which a conventional camera may be placed for weather protection purposes and clamped in position by means of a filter engaging the end of the lens assembly.

Another object of the invention is to provide a device of the character herewithin described which, is provided with a pair of clamping rings engaging the reinforced edges of a circular aperture formed within the wall of the enclosure, the rings then being held in position against the end of a lens assembly, by a filter ring with the camera being enclosed within the bag or enclosure.

Another object of the invention is to provide a device of the character herewithin described which enables the operator to manipulate the camera in the usual way due to the lightweight material used for the enclosure and due to the transparency thereof which enables the operator to view the various operating components of the camera.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which;

DESCRIPTION OF THE DRAWINGS

In the drawings like characters of reference indicate corresponding parts in the different figures.

DETAILED DESCRIPTION

Figure 1:
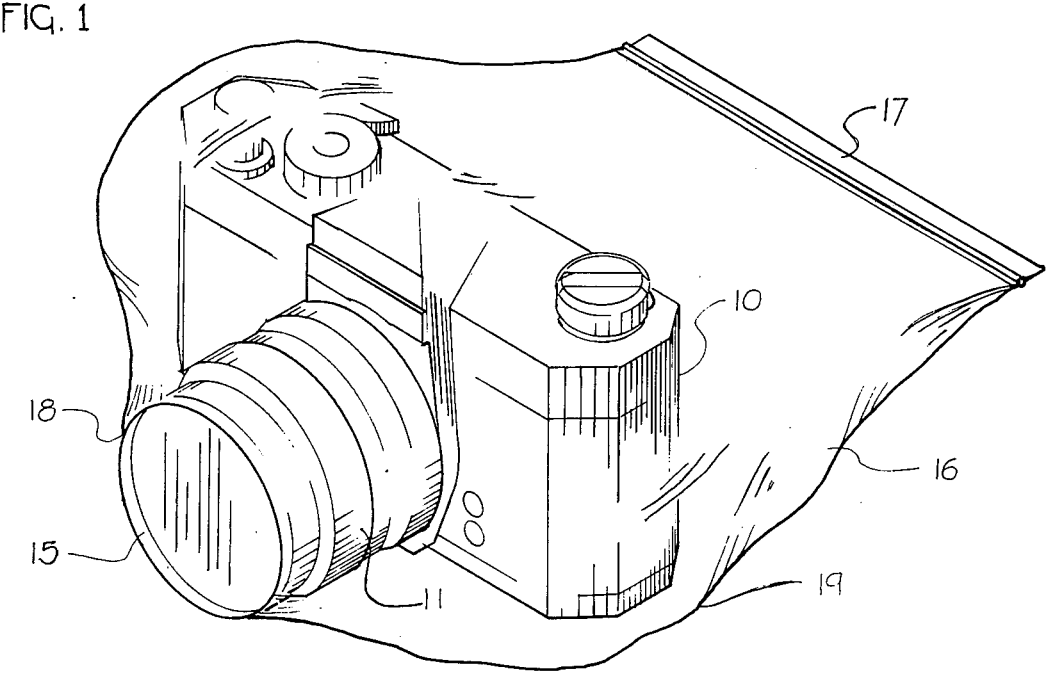
FIG. 1 is an isometric view of the enclosure showing a camera engaged therein.
Figure 2:
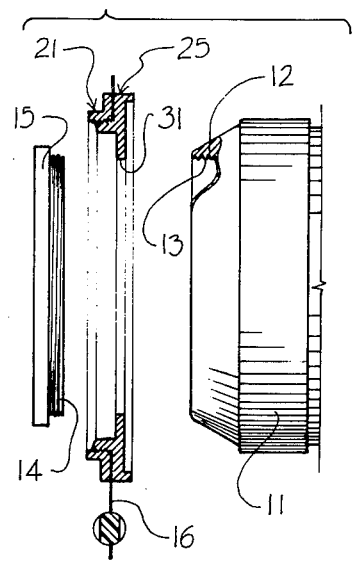
FIG. 2 is a side elevational exploded view showing one embodiment of the invention and one end of the camera lens assembly.
Figure 3:
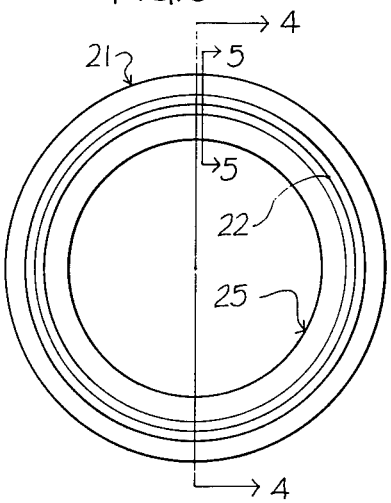
FIG. 3 is a front elevation of the two retaining rings.
Figure 4:
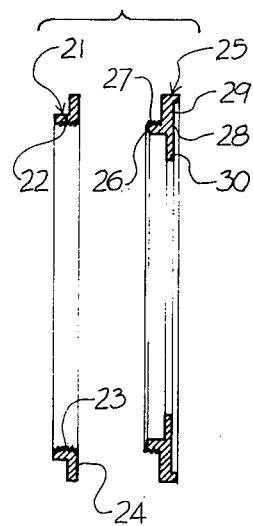
FIG. 4 is a section along the line 4—4 of FIG. 3.

Proceeding therefore to describe the invention in detail, reference character 10 illustrates any conventional camera which includes a lens assembly 11 having front end 12 which is provided with the conventional internal screw threading 13 adapted to receive a screw threaded portion 14 of a conventional screw in filter 15.

The invention comprises a flexible enclosure 16 which is in the form of a transparent bag or enclosure manufactured of flexible relatively thin plastic material such as polyethylene for example.

Closure means 17 are provided at one end of the enclosure and may take the form of the well known pressure lock closure manufactured under the trade name "ZIP LOCK".

Alternatively, the open end may be secured by a flexible tie or a slotted plastic strip all of which are conventional.

Figure 6:
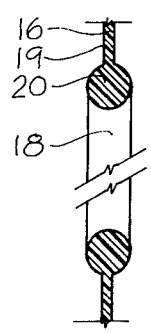
FIG. 6 is an enlarged fragmentary cross sectional view of the circular aperture formed within the enclosure.

A circular aperture 18 is formed through the wall of the enclosure 16 remote from the closure 17 and the edge of the wall 19 of the enclosure, defining the aperture 18, is preferably reinforced. In FIG. 6, this reinforcing takes the form of an annular bead 20 formed around the boundary of the aperture but of course other reinforcing means can be provided.

Figure 7:
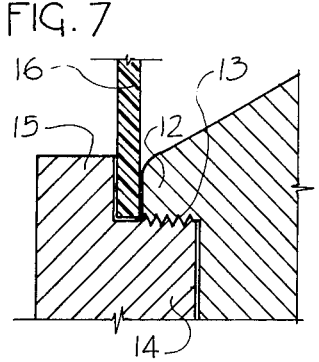
FIG. 7 is an enlarged fragmentary cross sectional view of the filter ring engaged with the lens ring.

The diameter of this aperture 18 is such that it enables the edge of the aperture to be clamped between the shouldered screw threaded portion 14 of the filter and the outer end 12 of the camera lens assembly as shown in FIG. 7, it being understood that the camera is within the enclosure.

The preferred embodiment is shown in FIGS. 2, 3, 4 and 5 under which circumstances a front and rear retaining ring assembly is provided.

The front ring collectively designated 21 consists of a horizontally situated annular flange 22 having screw threads 23 formed on the inner surface thereof. A vertically extending flange 24 extends outwardly from the inner end of the flange 22 substantially at right angles thereto thus forming the front ring 21.

Figure 5:
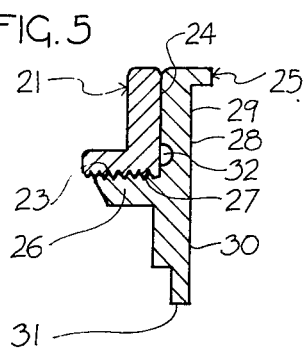
FIG. 5 is an enlarged fragmentary cross sectional view showing one embodiment of the two rings, along the line 5—5 of FIG. 3.

The rear ring collectively designated 25 also includes a horizontally extending annular flange 26 but in this case screw threads 27 are formed on the outer surface thereof and the diameter of this annular flange 26 is such that the screw threads 27 will screw threadably engage with the screw threads 22 as shown in FIG. 5.

A vertically situated annular flange 28 extends upon both sides of the inner end of the horizontal flange 26 forming an outer portion 29 and an inner portion 30 clearly illustrated in FIG. 5.

The reinforced edge 20 of the wall 19 defining aperture 18, is situated between the opposing faces of flange 24 and portion 29 of flange 28 whereupon the two rings are screw threadably engaged together thus clamping the reinforced edge between the rings in sealing relationship.

The two rings are then placed against the front end or ring 12 of the camera lens assembly 11 and the aforementioned filter 15 is screw threadably engaged within the end of the lens and the diameter of the aperture defined by the inner edge 31 of the portion 30 of the rear ring is such that it just engages over the screw threaded shouldered portion 14 of the lens so that the ring assembly is in turn held in sealing relationship against the end of the camera lens assembly 11.

If bead 20 is used as the reinforcing means for the boundary of the aperture 18, then an annular groove 32 is provided within one of the opposing faces of the two rings, within which the bead may seat thus assisting in the sealing relationship. In FIG. 5, this groove is shown formed in the inner or rear ring 25 but of course it can be formed in the outer ring 21 if desired or, grooves may be formed in both faces of the rings.

In operation, the camera is inserted within the enclosure 16 whereupon the closure 17 is closed and the end of the lens is offered to the aperture 18 formed in the wall 19 of the enclosure. If the embodiment shown in FIG. 7 is used, it is then merely necessary to engage the screw in filter 15 and clamp the boundary of the wall defining the aperture, between the filter and the end of the camera.

If however the preferred embodiment is used, then the inner and outer rings 21 and 25 are first engaged around the boundary of the wall defining the aperture 18 whereupon the screw in camera filter engages the end of the camera lens assembly thus clamping the rings to the lens assembly in sealing relationship.

The surface of the filter of course protects the lens assembly from adverse weather conditions and the flexible enclosure protects the remainder of the camera.

Being relatively thin and flexible as well as being transparent, the operator can manipulate the camera even although it is totally enclosed within the enclosure.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I Claim As My Invention:

1. A flexible enclosure for cameras which include a lens assembly and a filter screw threadably engageable with the front end of said lens assembly, said enclosure comprising in combination a flexible transparent enclosure, access means to said enclosure, detachable closure means for said access means, a circular aperture formed through the wall of said enclosure remote from said access means, reinforcing means around the edge of the wall defining said circular aperture and means to detachably secure said enclosure to said camera with said camera inside said enclosure, said last mentioned means including a front ring and a rear ring screw threadably engageable together with said reinforcing means being clamped there between in sealing relationship, said rear ring including an inwardly extending flange clampable between the associated filter and the end of the camera lens when said camera is within said enclosure.

2. The invention according to claim 1 in which said reinforcing means comprises an annular bead formed around the said edge of the wall defining said circular aperture.

3. The invention according to claim 2 which includes an annular groove on the inner surface of one of said rings adapted to receive said annular bead.

4. The invention according to claim 1 in which said front ring includes an annular horizontal flange and an annular vertical flange extending outwardly therefrom, screw threads formed on the inner surface of said annular horizontal flange, said rear ring including an annular horizontal flange and an annular vertical flange extending upon either side of the inner end of said horizontal flange at right angles thereto, the inner portion of said annular vertical flange forming said inwardly extending flange of said rear ring, screw threads on the outer surface of said annular horizontal flange screw threadably engageable with said screw threads on the inner surface of said horizontal flange of said front ring whereby the inner surface of said vertical flange of said front ring faces the outer surface of the outer portion of said vertical flange of said rear ring, said reinforcing means being clampable between said inner surfaces of said vertical flanges of said rings.

5. The invention according to claim 4 which includes an annular groove on the inner surface of one of said rings adapted to receive said annular bead.

6. A flexible enclosure for cameras which include a lens assembly and a filter screw-threadably engageable with the front end of said lens assembly, said enclosure comprising in combination a flexible transparent enclosure, access means to said enclosure, detachable closure means for said access means, a circular aperture formed through the wall of said enclosure remote from said access means, reinforcing means around the edge of the wall defining said circular aperture and means to detachably secure said enclosure to said camera with said camera inside said enclosure, said last mentioned means including a front ring and a rear ring screw-threadably engageable together with said reinforcing means being clamped therebetween in sealing relationship, one of said rings including flange means extending radially inwardly and being clampable between the associated filter and the end of the camera lens when said camera is within said enclosure.

* * * * *